United States Patent [19]

Vogg et al.

[11] Patent Number: 5,230,485

[45] Date of Patent: Jul. 27, 1993

[54] CONNECTOR DEVICE FOR SECURING STRUCTURAL COMPONENTS TO EACH OTHER

[75] Inventors: Guenter Vogg; Juergen Wieck, both of Deutschland, Fed. Rep. of Germany

[73] Assignee: Deutsche Aerospace Airbus GmbH, Hamburg, Fed. Rep. of Germany

[21] Appl. No.: 825,616

[22] Filed: Jan. 24, 1992

[30] Foreign Application Priority Data

Feb. 26, 1991 [DE] Fed. Rep. of Germany ....... 4102273

[51] Int. Cl.⁵ ...................... B64D 11/06; B61D 45/00; B64C 1/20
[52] U.S. Cl. .............................. 244/118.2; 244/118.6; 244/131; 410/104; 410/105; 410/150
[58] Field of Search ............... 244/118.1, 118.2, 118.6, 244/131, 132; 410/81, 90, 95, 130, 139, 101, 102, 104, 105, 115, 150; 248/503, 503.1

[56] References Cited

U.S. PATENT DOCUMENTS

| 4,230,432 | 10/1980 | Howell | 410/102 |
| 4,493,470 | 1/1985 | Engel | 244/118.6 |
| 4,630,982 | 12/1986 | Fenner | 410/102 |
| 4,708,549 | 11/1987 | Jensen | 248/503 |
| 4,796,837 | 1/1989 | Dowd | 248/503.1 |
| 4,958,875 | 9/1990 | Zamzow | 248/503 |
| 5,137,405 | 8/1992 | Klein | 410/104 |

FOREIGN PATENT DOCUMENTS

| 053923 | 6/1982 | European Pat. Off. | 244/118.6 |
| 105675 | 4/1984 | European Pat. Off. | 244/118.2 |
| 327990 | 8/1989 | European Pat. Off. | 244/188.6 |
| 3232234 | 5/1984 | Fed. Rep. of Germany . | |

Primary Examiner—Joseph F. Peters, Jr.
Assistant Examiner—Virna Lissi Ansley
Attorney, Agent, or Firm—W. G. Fasse

[57] ABSTRACT

A connector device is constructed for fixing and holding of structural components to each other, more specifically of secondary components to a primary support component. The primary support component may, for example, be a support rail with a clamping gap and the secondary components may be cross beams for carrying floor panels and the like, for example, in an aircraft. The connector device has a base plate and a carrier body extending from the base plate as well as connector flanges secured to the carrier body and preferably also to the base plate. A central bore passing through the carrier body and through the base plate receives a clamping bolt that grips with its head under rail edges forming a gap. A nut on the clamping bolt rests against a shoulder in or on the carrier body.

7 Claims, 4 Drawing Sheets

CONNECTOR DEVICE FOR SECURING STRUCTURAL COMPONENTS TO EACH OTHER

FIELD OF THE INVENTION

The invention relates to a connector device for connecting structural components to each other in a releasable manner.

BACKGROUND INFORMATION

Connector devices of this type are used, for example, to interconnect secondary structural components to a primary support structure. The former may, for example, comprise cross-beams, level-compensating floor panels, seating arrangements, and the like. The primary support structure may, for example, comprise support rails in the floor of an aircraft, whereby the floor may be the floor of a passenger cabin or of a cargo hold. The support rails in the floor of an aircraft comprise a cross-section that has a longitudinal slot between overhanging rail edges. In a commercial aircraft these support rail sections cooperate with lug bolts having somewhat mushroom-shaped heads and riding in the slot to act as clamping members. The rail edges forming said slot are provided with openings through which the lug bolts extend while the bolt heads interlock with the rail edges.

In connection with the floor area of a commercial aircraft, the openings in the rail sections have a standard on-center spacing from one another whereby the rails can serve as support rails for the seating arrangement in a passenger cabin, or for the locking down of components of a freight loading system.

OBJECTS OF THE INVENTION

In view of the foregoing it is the aim of the invention to achieve the following objects singly or in combination:

- to provide a connector device for the above field of application, whereby components of a secondary structure, such as pieces or panels of a level compensating floor system, cross ribs or the like, can be secured and held in an easy manner, by a rail section forming a primary structural component;
- to construct the base body of the present connector device so that it forms a single piece, integral structure with all its components; and
- to provide the present connector device with a clamping or locking member that is movable for a locking and unlocking motion in two directions and for a clamping action in yet a third direction for an easy release of the connector device.

SUMMARY OF THE INVENTION

The above objects have been achieved according to the invention by a connector device which is characterized by the following combination of features. A base plate supports a carrier body extending from the base plate and connector flanges are secured to the carrier body and preferably also to the base plate. A central bore passes through the carrier body and through the base plate, preferably perpendicularly to the longitudinal extension of a support rail to which the present connector device is connectable by a locking element, such as a screw bolt having a clamping head, said bolt passing through the central bore for a rotational movement and for a vertical displacement in said bore, whereby the shaft of the clamping element fits into a slot between two overhanging rail edges and the head wedges under these rail edges. The base plate is provided with cylindrical protrusions sized and spaced from one another on-center to fit into openings in the support rail, whereby the on-center spacings between the protrusions and the on-center spacings between the openings in the support rail correspond to each other.

The just described combination of features of the invention have the advantage that, due to its simplicity, the present connector device is very simple to produce, for example, as a cast component provided with the central bore for the clamping bolt or member. Another advantage is seen in that its use is very versatile, not only in the converting of a floor in an aircraft from a passenger service configuration to a freight carrying configuration and vice versa, but also for many other purposes, such as leveling floors and the like.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
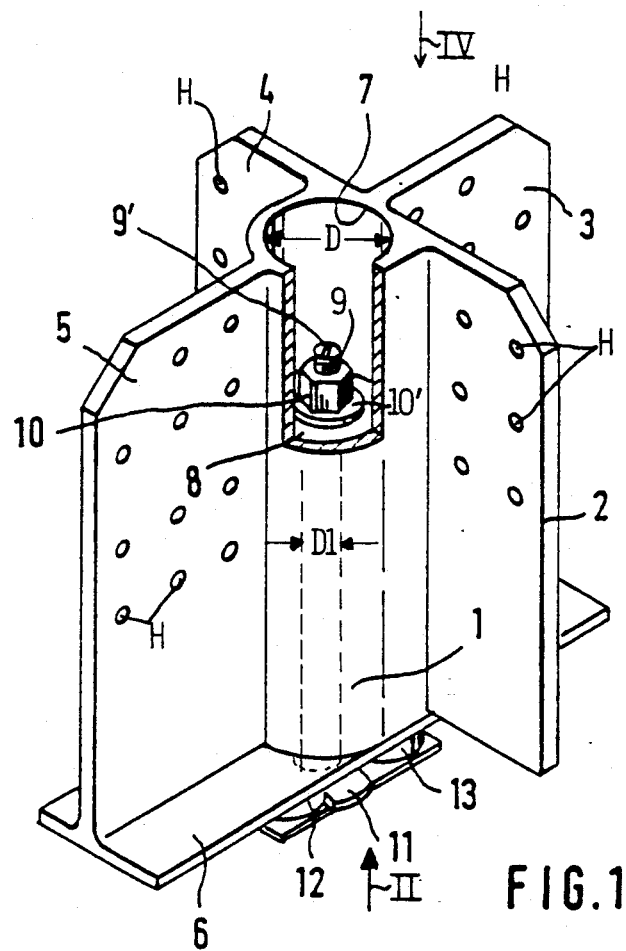
FIG. 1 is a perspective view of a connector device according to the invention with the central carrier body shown partially in section.

FIG. 1 illustrates a connector device according to the invention, comprising a base plate 6 supporting a carrier body 1, preferably of cylindrical or approximately cylindrical construction and carrying a plurality of, for example four, connector flanges 2, 3, 4, and 5. The flanges are preferably secured to the base plate 6 and the carrier body 1, and extend at right-angles relative to each other. Preferably, the base plate 6, the carrier body 1, and the four connector flanges 2, 3, 4, and 5, are constructed as a single one-piece integral unit. The carrier body 1 and the flanges extend perpendicularly to the base plate, and the flanges in turn extend in parallel to the longitudinal central axis of the carrier body, but perpendicularly to one another. Each connector flange is provided with a plurality of connector holes H, for example, for passing rivets or screw bolts through these holes H. Preferably, one pair of flanges 3, 5 coincides with the central axis.

Figure 2:
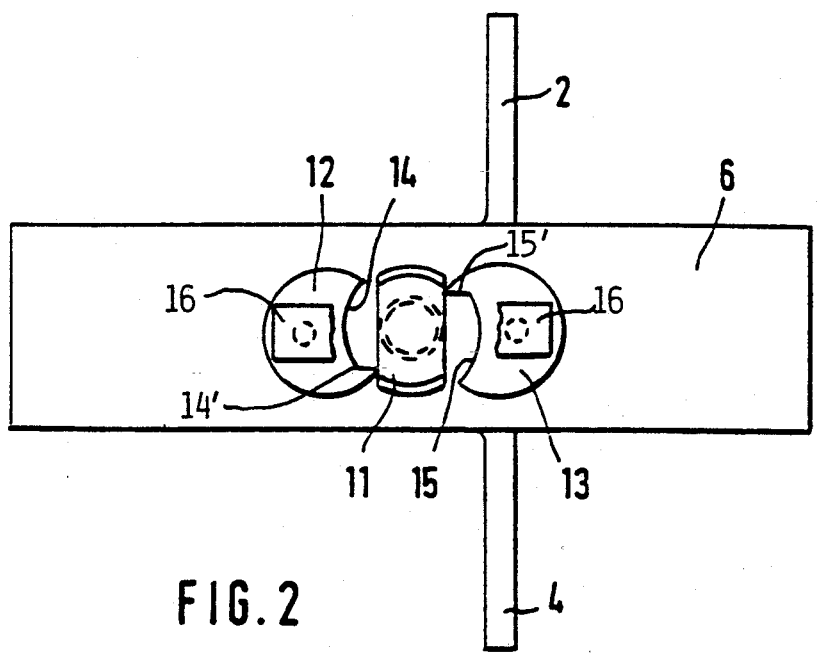
FIG. 2 is a view in the direction of the arrow II in FIG. 1.

Preferably, the unitary integral structure of the elements 1 to 6 is obtained by conventional casting methods. However, it is quite possible to construct these elements separately and weld them together or to form the connector device as a forged, especially a drop forged component, or as a milled component. The carrier body 1 has a central axial bore 7 which first has a larger diameter D for approximately ⅓ of the axial length of the carrier body 1, and which then changes into a smaller diameter D1 for the rest of the length of the carrier body 1. The smaller diameter portion D1 of the bore also passes through the base plate 6. A shoulder 8 is formed between the larger diameter portion D and the smaller diameter portion D1. A clamping bolt 9 having a clamping head 11, passes through the bore 7 sufficiently so that the upper end of the bolt 9 can carry a clamping nut 10 and a washer 10'. The nut bears through the washer against the shoulder 8. The clamping bolt head 11 has an elongated configuration since its sides are cut-off as best seen in FIG. 2 and in FIG. 3a. The upper end of the bolt 9 is provided with a slot 9' for turning the bolt when the nut 10 is loosened, as will be described below.

FIG. 2 shows the bottom face of the carrier plate 6. Two substantially cylindrical protrusions 12 and 13 project downwardly in FIG. 1, and toward the viewer in FIG. 2. Each protrusion 12, 13 is provided with a curved recess 14, 15 respectively. Each recess ends in a stop 14' and 15' against which the head 11 of the clamping bolt 9 will abut, if the clamping bolt head 11 is in one or the other end position. FIG. 2 shows the locked position of the clamping bolt head 11 against edges of a rail not shown in FIG. 2, but visible, for example at 22 in FIG. 4. The rail 22 has openings O, with an on-center spacing OC from opening to opening corresponding to the on-center spacing between the two protrusions 12 and 13. The diameter of the openings O and the diameter of the protrusions 12 and 13 is so selected that the protrusions are snuggly received in the openings O. The rail 22 has inwardly projecting rail edges 22a forming a gap G between the openings O. The curvature of the curved recesses 14 and 15 is so dimensioned that they can receive the clamping head 11 between the walls forming the recess, when the head 11 is passed through a 90° rotation from the position shown in FIGS. 2 and 3c, into the position shown in FIG. 3b and vice versa. In both instances, the stops 14' and 15' form a limit for the 90° rotational movements of the head 11, please see FIGS. 3b and 3c in conjunction.

Figure 3A:
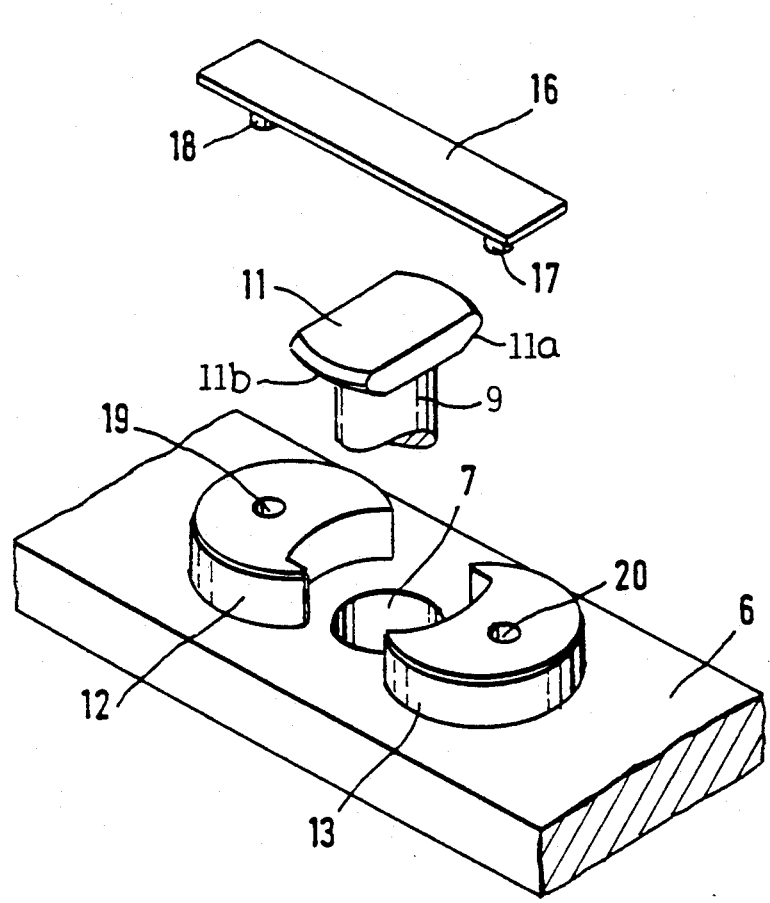
FIG. 3a is a perspective, exploded view of the bottom side of the base plate, and also shows a portion of the clamping bolt and of a bolt retaining member.

As shown in FIG. 3a, the bolt 9 fits into the central bore 7, whereby the bolt is held in place by a retaining plate 16 having studs 17 and 18 snuggly fitting into holes 19 and 20 in the protrusions 12 and 13. Thus, when the retaining plate 16 is in position, the head 11 cannot fall out of the bore 7.

Figure 3B:
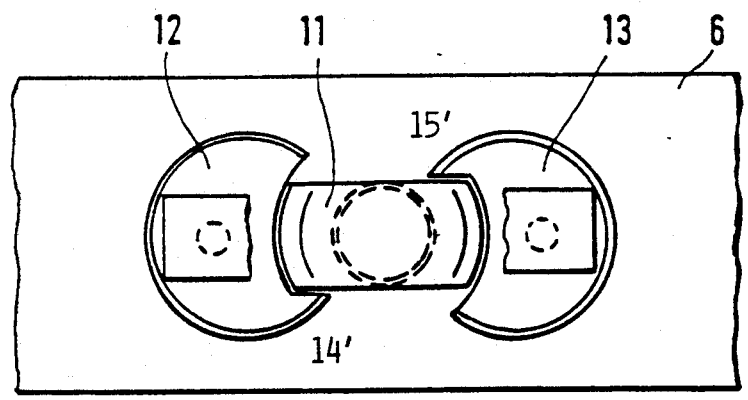
FIG. 3b shows the bolt head in an unlocked position permitting the easy removal of the connector device from a support rail.
Figure 3C:
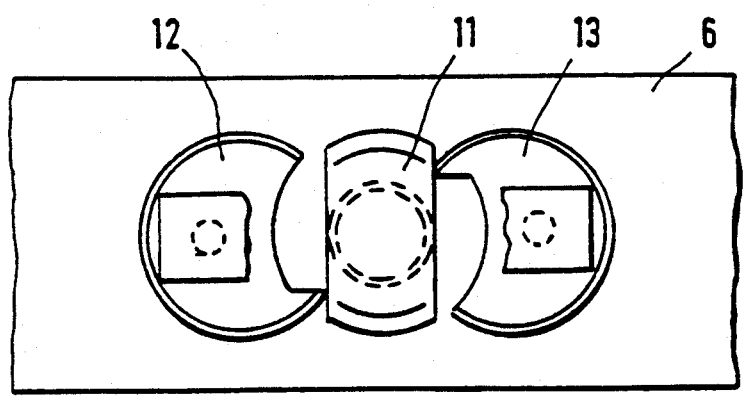
FIG. 3c shows the bolt head in a clamping position.

FIG. 3a also shows the ramps 11a and 11b that will wedge under the rail edges 22a when the head 11 assumes the position of FIG. 3c.

Figure 4:
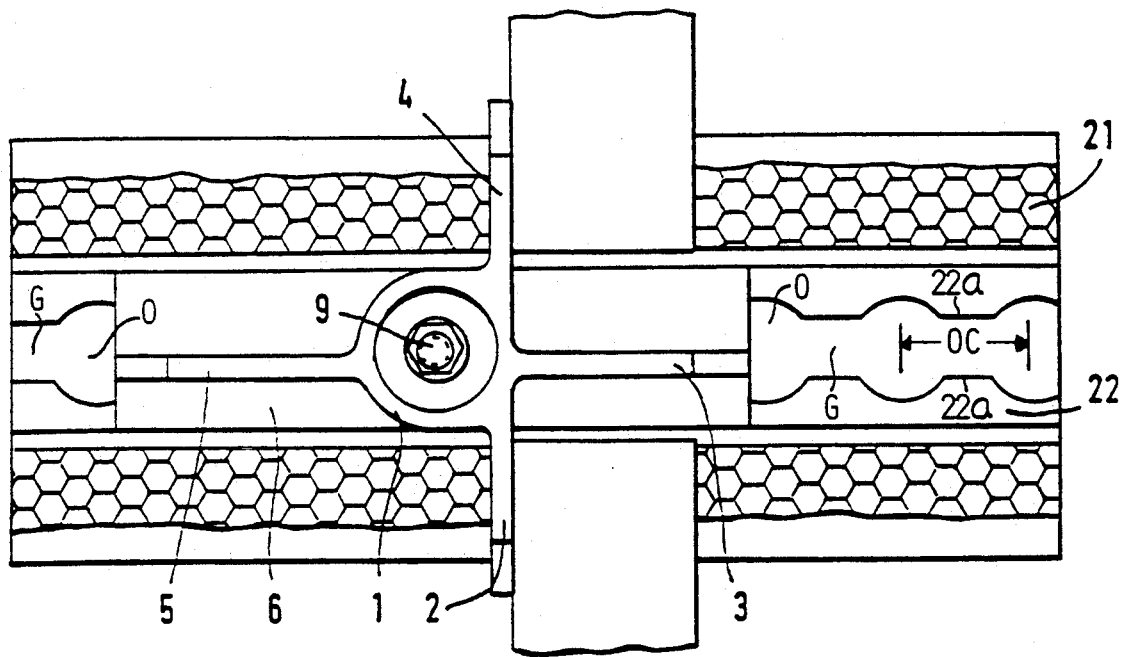
FIG. 4 shows an installed connector device according to the invention as viewed in the direction of the arrow IV in FIG. 1.
Figure 5:
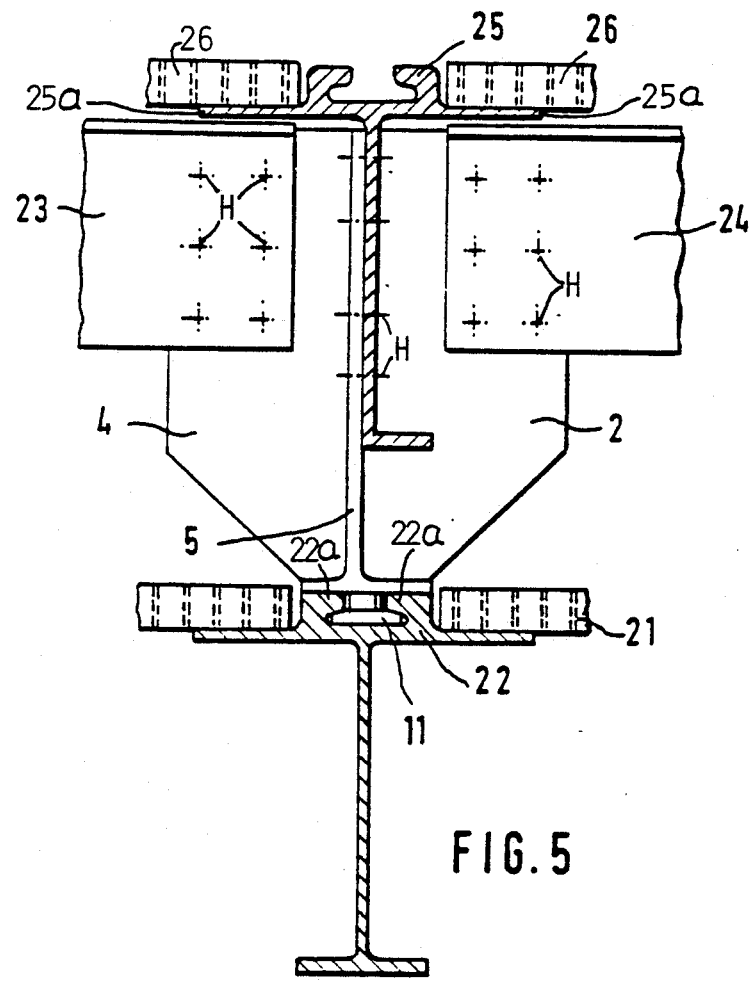
FIG. 5 shows a vertical section perpendicularly to the length of a support rail illustrating the installed position of a connector element according to the invention connecting several components to each other above the support rail.
Figure 6:
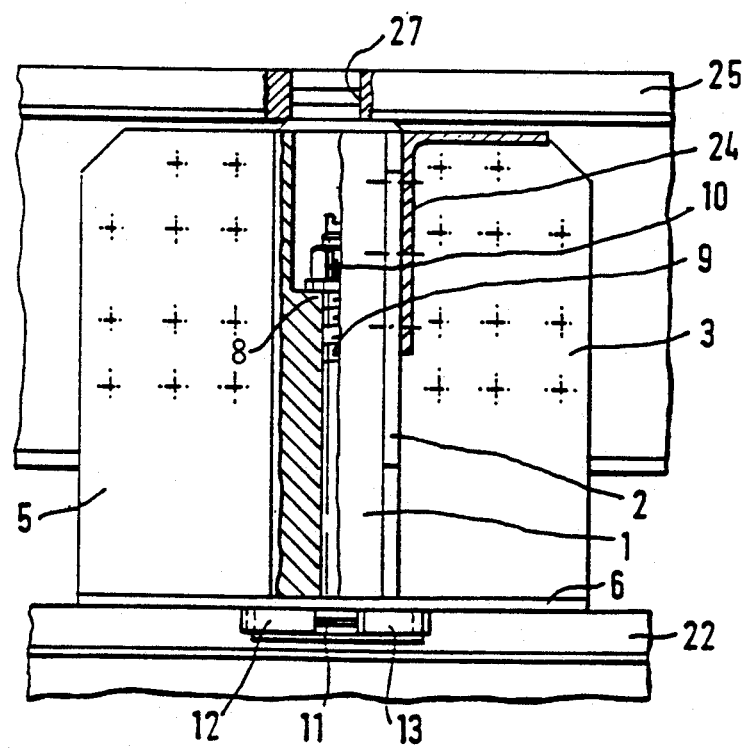
FIG. 6 is a view, partially in section, along a section plane extending approximately in parallel to the length of the support rail.

The present connector device is installed by positioning the head 11 as shown in FIG. 3b, whereby the head fits into the gap G shown in FIG. 4 and the protrusions 12 and 13 fit into two neighboring holes O, also shown in FIG. 4. The bolt 9 is then rotated to clamp the connector device into the support rail 22 that forms a primary structure for supporting, for example, floor panels 21. A secondary structure may now be secured to the connector flanges 2, 3, 4, and 5 as seen in FIGS. 5 and 6. The secondary structures comprise, for example, cross struts or beams 23, 24, and further secondary support rails 25 secured to the connector flanges by conventional means indicated at H. The secondary support rail 25 may be provided with flanges 25a for carrying a further floor structure 26. Thus, it will be seen that the present connector members may have substantial dimensions for separating one floor from another, for example, inside the body of an aircraft.

Once the clamping bolt 9 has been turned from the position shown in FIG. 3b into the position shown in FIG. 3c, the completion of the clamping is performed by tightening the nut 10 sufficiently for a proper clamping. The diameter of the larger bore section D is sufficient for the insertion of a tool and the floor structure is such as to leave an opening, for example, a plugged-up opening for an access of a tool to operate the nut 10 when the plug is removed. Once the connector device is secured as just described, the additional secondary components 23, 24, 25, 26 may be readily installed. If one of the secondary components is a further support rail 25 as shown in FIGS. 5 and 6, an opening 27 will be provided for the access of a tool to the nut 10 as mentioned above. This feature has the advantage that floor sections may be preassembled and then put in place, whereby the connection to the support rail 22 merely requires the turning of the clamping head 11 and the tightening of the nut 10. Thus, preassembly of secondary components with the present connector device is possible or subsequent assembly may be used once the device itself is installed.

Another advantage of the present connector device is seen in that it may simply be shortened by cutting off a portion opposite the base plate 6 for accommodating connecting points of the primary structure at different elevational positions.

Although the invention has been described with reference to specific example embodiments, it will be appreciated that it is intended to cover all modifications and equivalents within the scope of the appended claims.

What we claim is:

1. A connector device for securing structural components to each other and to a support rail having locking edges forming a rail gap with uniformly spaced openings in said locking edges along said gap, comprising a base plate (6), a tubular member forming a carrier body (1) extending from said base plate, at least two connector flanges secured to said base plate and to an outer wall of said tubular member, said at least two flanges extending away from said tubular member and being angularly spaced from each other, a central through bore passing through said tubular member and through said base plate, a locking element received for rotational and vertical displacement in said central through bore, said locking element having a locking head for riding in said rail gap of said support rail, and wherein said base plate comprises cylindrical protrusions (12, 13) opposite said tubular member, said protrusions being sized and spaced from one another on-center to fit into said openings in said support rail, whereby on-center spacings between said protrusions and on-center spacings between said openings in said support rail correspond to each other.

2. The connector device of claim 1, comprising four connector flanges spaced from one another by 90°, each of said four connector flanges being connected to said outer wall of said tubular member and to said base plate.

3. The connector device of claim 1, wherein said base plate, said carrier body, and said connector flanges are all formed as an integral one piece component.

4. The connector device of claim 1, wherein each of said connector flanges comprises a plurality of connection through holes.

5. The connector device of claim 1, wherein said through bore has a large diameter section, a small diameter section, and a shoulder between said sections, said locking element comprising a threaded locking bolt, one end of which is formed as said locking head, and the other end of which carries a threading with a locking nut bearing against said shoulder in a locked condition of said connector device.

6. The connector device of claim 1, wherein said tubular member forming said carrier body is substantially cylindrical, and wherein said connector flanges comprise four connector flanges forming first and second pairs of flanges, said first pair of flanges extending in alignment with a central axis of said tubular member and lengthwise on said base plate, said second pair of flanges extending off-center relative to said central axis and approximately tangentially to said carrier body and crosswise to said base plate.

7. A connector device for securing structural components to each other and to a support rail having locking edges forming a rail gap with uniformly spaced openings in said locking edges along said gap, comprising a base plate (6), a carrier body (1) extending from said base plate, connector flanges means secured to said carrier body, a central through bore passing through said carrier body and through said base plate, a locking element received for rotational and vertical displacement in said central through bore, said locking element having a locking head for riding in said rail gap of said support rail, and wherein said base plate comprises cylindrical protrusions opposite said carrier body, said protrusions being sized and spaced from one another on-center to fit into said openings in said support rail, whereby on-center spacings between said protrusions and on-center spacings between said openings in said support rail correspond to each other, wherein said carrier body is substantially cylindrical, and wherein said connector flange means comprise four connector flanges forming first and second pairs of flanges, said first pair of flanges extending in alignment with a central axis of said carrier body and lengthwise on said base plate, said second pair of flanges extending off-center relative to said central axis and approximately tangentially to said carrier body and crosswise to said base plate.

* * * * *

UNITED STATES PATENT AND TRADEMARK OFFICE
CERTIFICATE OF CORRECTION

PATENT NO. : 5,230,485

DATED : July 27, 1993

INVENTOR(S) : Guenter Vogg et al.

It is certified that error appears in the above-identified patent and that said Letters Patent is hereby corrected as shown below:

on the title page, [75] Inventors: should read as follows:
  --Guenter Vogg; Juergen Wieck, both of Bremen,
    Federal Republic of Germany--;

Column 6, line 4, replace "flanges" by --flange--.

Signed and Sealed this

Eighth Day of February, 1994

Attest:

BRUCE LEHMAN

Attesting Officer

Commissioner of Patents and Trademarks